May 24, 1966   D. W. CHAMBERLIN   3,252,560
FRUIT TRANSFER DEVICE
Filed July 29, 1964   3 Sheets-Sheet 2
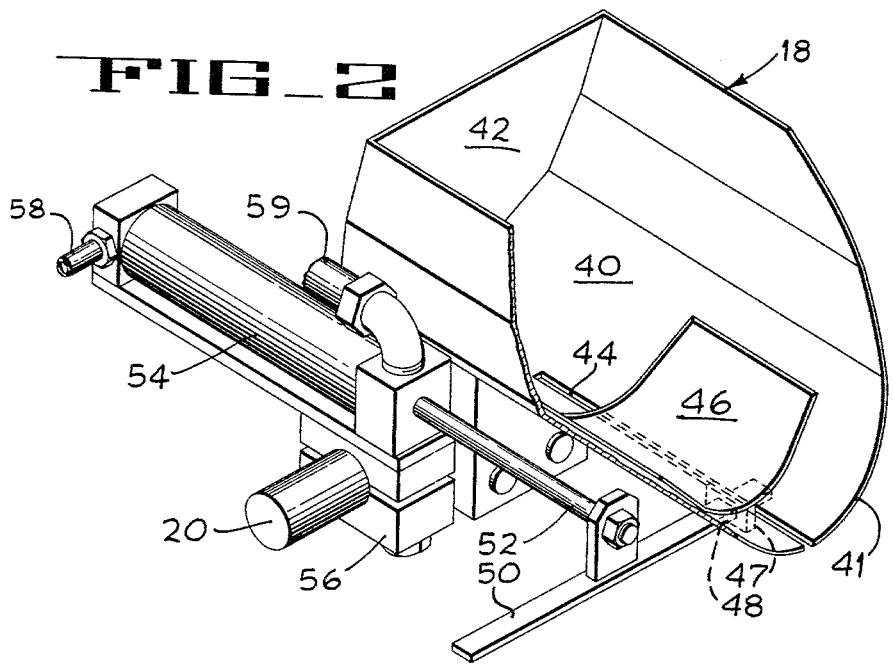
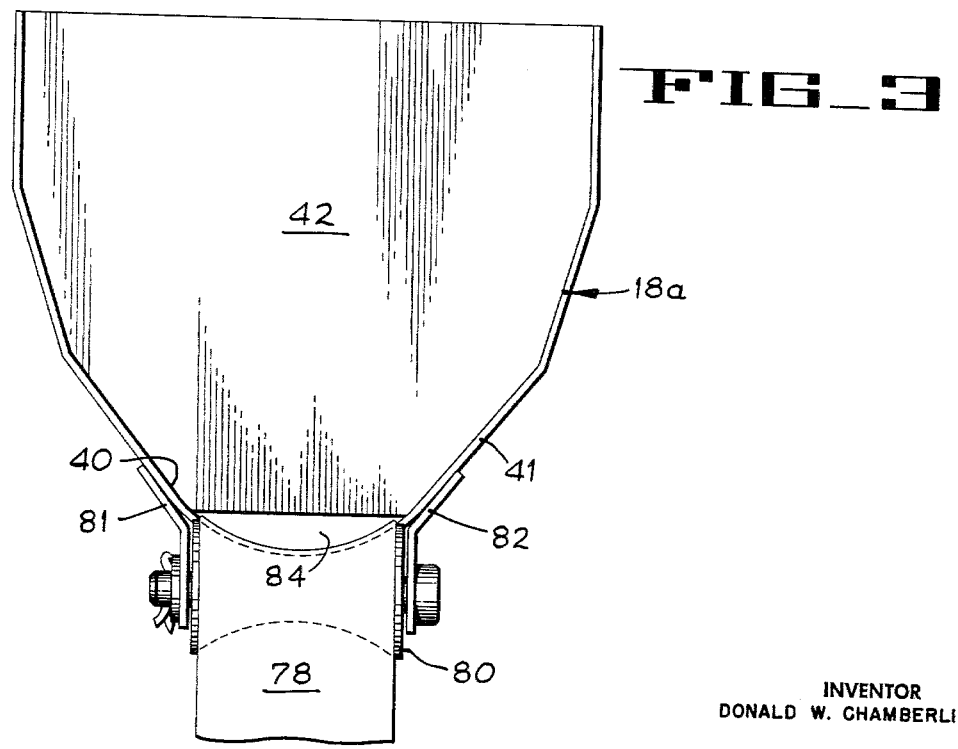
INVENTOR
DONALD W. CHAMBERLIN
BY Hans G. Hoffmeister
ATTORNEY

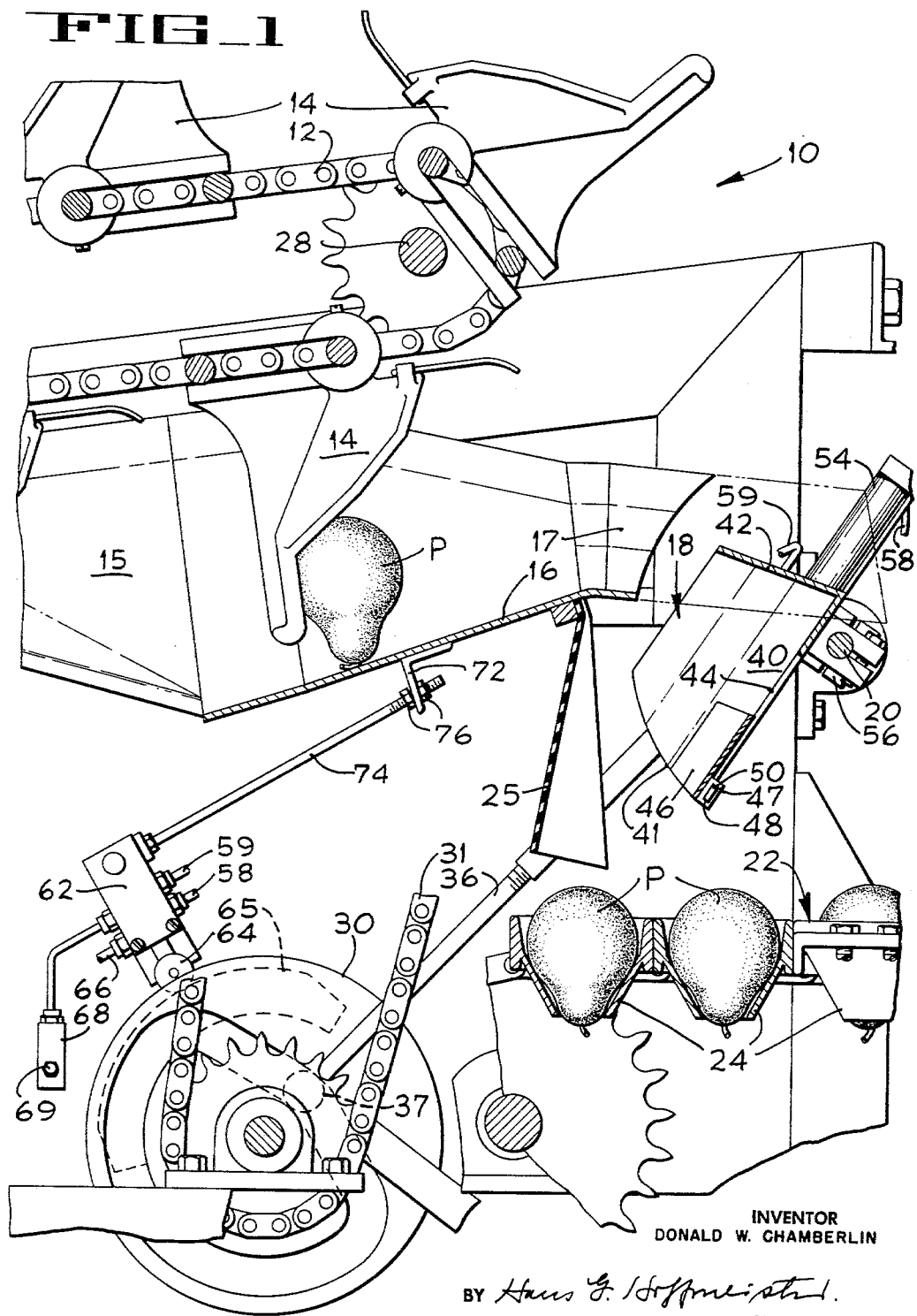

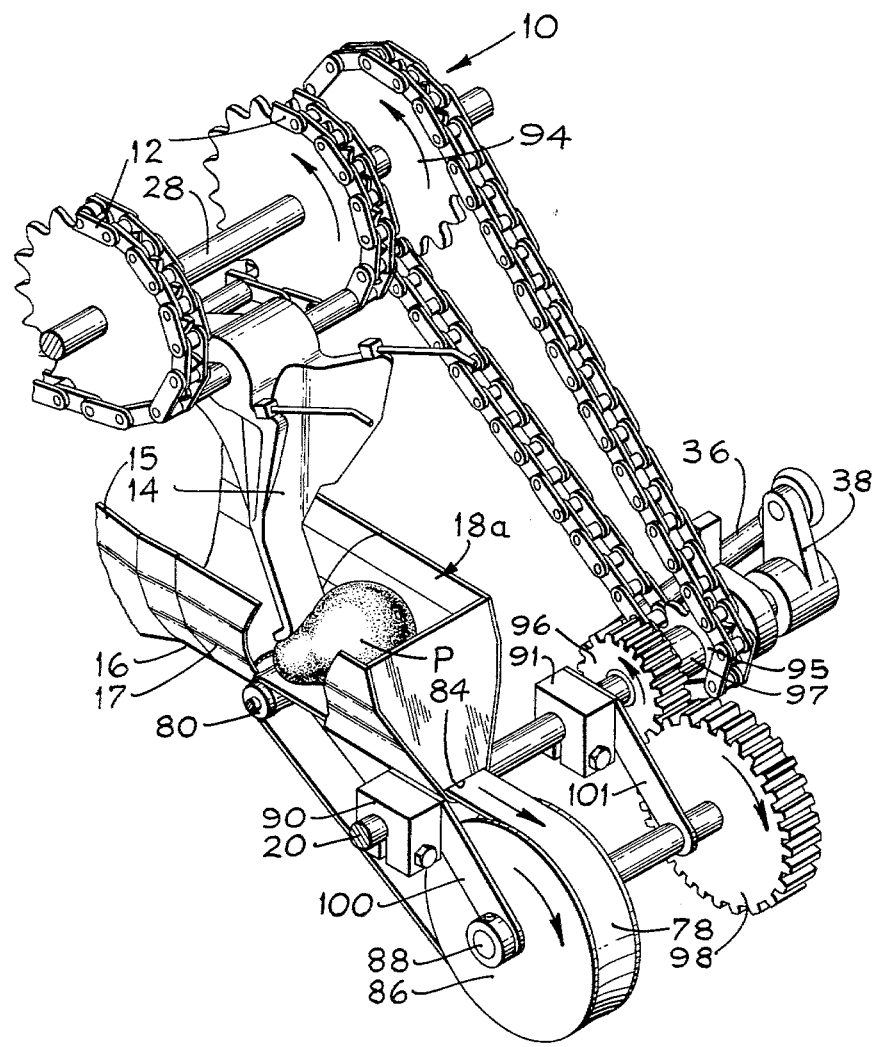

United States Patent Office 3,252,560
Patented May 24, 1966

3,252,560
FRUIT TRANSFER DEVICE
Donald W. Chamberlin, Los Gatos, Calif., assignor to FMC Corporation, San Jose, Calif., a corporation of Delaware
Filed July 29, 1964, Ser. No. 385,944
10 Claims. (Cl. 198—26)

The present invention pertains to a device for transferring fruit from one type of conveying system to another and more particularly to a device which will transfer fruit between separate, spaced conveying systems while maintaining a particular axial alignment or orientation of the fruit.

Although the device of the present invention is by no means limited to the handling of the fruit of any one type or for any one particular purpose, it may be used to advantage with orienting apparatus utilized in the high-speed industrial processing of fruit such as pears. Orienting apparatus of the type referred to is described in copending United States patent application Ser. No. 206,787, of Gerald R. Anderson et al., which was filed on July 2, 1962, and assigned to the assignee of the present invention. In the apparatus described in that patent application, a continuous conveying system is provided which receives peeled pears in uniformly spaced relationship but in randomly arranged orientation. The apparatus, which is in the form of an elongate chute, orients the pears into a stem-end-down position by pushing them through a generally V-shaped channel of the chute by means of a series of wing-shaped pushing elements. The far end portion of the chute is separately mounted for pivotal movement so that it may receive the pears from the chute and discharge them to a take-away conveyor arranged therebeneath and provided with a series of fruit holding pockets. The pivotal end portion of the chute therefore acts as a transfer device in transferring the pears from the chute to the pocketed conveyor, and, in so doing, it maintains the desired stem-end-down orientation of the pears upon the take-away conveyor.

It is with this transfer device that the present invention is concerned.

One of the important factors in the operation of the transfer device of the present invention is that the already oriented fruit is received within the device through the action of gravity. That is to say, the fruit slides or otherwise gravitates down the interior surface of the device which is shaped in the form of a scoop. The device is angled slightly upwardly towards its open end during this fruit receiving phase of its operation. When the fruit is fully received therewithin, the device is rotated downwardly about a transverse axis at the rearward or closed end thereof so that the fruit slides out of the device and into the take-away conveyor located directly therebeneath. The described operation is performed so that the stem ends of the fruit will always be in the lowermost position upon the pocketed conveyor whereby the fruit will be in the proper position for further processing operations.

One of the greatest problems of fruit transfer devices of this type is the tendency for the fruit to roll during its sliding reception into the device whereby it loses its proper alignment and orientation. This is particularly true in large-scale commercial fruit processing operations wherein the pears to be processed come in various shapes and sizes including some shapes which are almost round and, therefore, are very prone to roll under the frictional contact involved in their sliding descent into the transfer devices. The high speeds at which such operations are carried out also contribute to the loss of orientation and misalignment involved in the transfer of the fruit between the two separate conveying systems.

It is an object of the present invention to provide a transfer device which will eliminate any tendency for an article received therein to roll or otherwise become misaligned even though the device is operated at high speeds and accomplishes a complete reversal of the direction of motion of the article.

Another object of the invention is to provide an improved device for transferring fruit in a fruit handling system from a substantially horizontal position to a substantially vertical position at a lower elevation wherein the trailing ends of the fruit in their horizontal orientation are placed in the lowermost position in their vertical orientation.

Another object of the present invention is to provide an improved fruit transfer device for receiving fruit from a chute aligning conveyor and transferring it to a conveyor spaced therebelow which is comprised of a series of fruit holding cups.

Another object of the present invention is to provide a fruit handling system wherein fruit is transferred between spaced conveying systems at different elevations by means of a reversal of the direction of motion of the fruit while its particular alignment and orientation with respect to the system is maintained.

Other objects and advantages of the invention will become apparent from the following detailed description and the accompanying drawings, in which:

FIGURE 1 is a fragmentary vertical section through fruit handling and orienting apparatus which embodies the transfer device of the present invention with the transfer device being shown in full lines its fruit discharging position and in phantom lines in its fruit receiving position.

FIGURE 2 is an enlarged fragmentary perspective of the transfer device of the present invention with a portion thereof being broken away for the purpose of illustration.

FIGURE 3 is a front elevation of a modified form of the transfer device.

FIGURE 4 is an isometric of a portion of the fruit handling and orienting apparatus shown in FIG. 1 but with the modified form of the transfer device shown in FIG. 3 being utilized therewith and being illustrated in its fruit receiving position.

Referring now more particularly to the drawings, FIG. 1 shows a portion of fruit handling and orienting apparatus 10 which is designed to utilize the device of the present invention. This apparatus is identical to that disclosed in the aforementioned United States patent application Serial No. 206,787 and reference may be had to said application for a complete description of any part of the apparatus 10 not specifically described herein. Generally, the components of the orienting apparatus 10 include an endless chain conveyor 12 having a plurality of wing-shaped pusher elements 14 attached thereto and a conveying chute 15. The pusher elements 14 individually push fruit such as pears P through the chute and in so doing cause the pears to become aligned axially of the chute and oriented into a stem-end-down position due to the generally V-shaped cross sectional configuration of the chute. At the rearward end of the chute, the bottom wall 16 thereof is gradually elevated to receive the lower end of the pear. The end portion 17 of the chute is generally U-shaped in cross section, and, in this portion, the pear will be received upon the bottom wall 16 in an approximately horizontal position.

Adjacent to the end 17 of the chute 15 there is positioned a transfer device 18 which is rigidly mounted upon a transverse shaft 20. This device, which comprises the subject matter of the present invention, is arranged to receive the pears P from the pusher elements 14, reverse their direction of motion, and transfer them to a take-away conveyor 22 which is located directly therebeneath and which is provided with a series of fruit holding cups 24. In its receiving position (shown in phantom lines in FIG. 1), the walls of the channel-shaped transfer device 18 mate with the walls of the end portion 17 and form a continuation of the chute. The transfer device, in this position is angled slightly upwardly toward the chute so that the pears P will move into the device under the action of gravity. During the second part of the transfer operation the shaft 20 is arranged to be rotated counterclockwise (FIG. 1) to a second position wherein the transfer device will be swung into a position angled downwardly toward the conveyor 22 thus causing the pear received therein to be discharged from the device and dropped into one of the cups 24 of the conveyor. A flexible guide member 25 is attached to the underside of the wall 16 to provide a guide for the discharged pear and to direct it into the proper receiving cup.

During the operation of the fruit orienting apparatus 10 each of the above described moving parts will operate in a predetermined timed relation so that they will cooperate with each other to properly feed the pears P through the system. The pusher conveyor 12 is driven by a power source such as an electric motor (not shown) which is operatively connected to a drive shaft 28 at the lead end of the conveyor 12. Drive shaft 28 also has a drive connection (not shown) which serves to advance a drive chain 31 and rotate a cam member 30 mounted at the bottom of the orienting apparatus.

The cam member 30 effects the oscillatory motion of the transfer device 18 by means of a connecting rod 36 and an attached cam follower 37 which rides in a cam track 33 located on the face of the cam member (FIG. 1). One end of the connecting rod is attached to the cam follower and the other end is rigidly connected by means of a crank 38 (FIG. 4) to the shaft 20 which carries the transfer device. The rotation of the cam track 33 therefore serves to oscillate the transfer device between its two positions. The timed relationship between the transfer device 18 and the chain conveyor 12 is such that the transfer device will be oscillated between its discharging position (shown in solid lines in FIG. 1) and its receiving position (shown in phantom lines in FIG. 1) for each pear P that is moved into the device by the pusher elements 14. It will also be apparent that the cam member 30 must make one complete revolution during the time necessary for the pusher elements 14 to traverse the linear distance between two adjacent elements.

The take-away conveyor 24 is also moved in a timed relationship with the elements 14 and the transfer device 18 so one pear will be received in each cup 24. This conveyor is therefore linearly and incrementally moved (by means not shown) through a distance equal to the spacing between the centers of adjacent cups during each complete cycle of the transfer device.

The specific improvement with which the present invention is concerned is in the operation of the transfer device 18. It has been found that former transfer devices of this general type could cause the desired orientation of the fruit to be lost when the fruit was received therein. This problem occurred because each individual fruit must slide into the transfer device along the bottom surface thereof before it could be pivoted and discharged. When fruit was handled which was quite round in shape, there was a pronounced tendency for the fruit to roll over due to the frictional drag imposed on it by the bottom surface of the device. Any such rolling would, of course, affect the alignment and orientation in which the fruit was transferred to the receiving cups 24.

The improved transfer device 18 of the present invention is best shown in FIG. 2. It has a channel-shaped cross section with a uniformly curved bottom portion 40 terminating in a curved front lip 41 and a flat rear wall 42 which is inclined towards the front or receiving end of the device. A slot 44 extends longitudinally down the center of the curved bottom portion from the front lip. This slot serves as a mounting for a thin plate 46 which is curved in the same manner as the bottom portion 40 and is arranged to be carried along said bottom portion during the operation of the transfer device. The mounting means for the plate includes a bracket 47 attached to the undersurface of the plate and provided with a slot 48. The bracket 47 extends through the slot 44 to position the movable plate within the transfer device. It is moved forward and backward in the slot by an extension member 50 inserted through the slot 48 in the bracket. This extension member is, in turn, securely attached to the distal end of a piston rod 52 that is arranged to be reciprocated within an air cylinder 54. The cylinder and its associated mechanism are all rigidly mounted upon the oscillating shaft 20 by means of a clamp 56 positioned adjacent to the transfer device (FIG. 2).

The function of the plate 46 is to reduce the friction imposed upon the incoming pear as it is propelled into the transfer device from the chute 15. As the pear is pushed across the lip 41 it will be received upon the plate 46 which will be in a position at the open end of the transfer device to accommodate it. The plate 46 will then be moved by means of the piston rod 52 toward the rear wall 42 at a speed approximating that of the incoming pear. Since the plate 46 is moving in the direction in which the pear will gravitate, there will be little or no relative movement between the pear and the plate which is supporting it. Hence, there will be little or no tendency for the pear to be moved out of the oriented stem-end-trailing position in which it is received in the transfer device. Thus, when the pear is ejected from the device during its downward pivotal movement it will be in the proper stem-end-down position to be received within the cups 24 of the take-away conveyor.

It will be apparent from the foregoing description that the transfer plate 46 must be reciprocated at the same frequency that the device 18 is oscillated so that it will be in the proper position to act upon each pear. This is accomplished through the controlled alternate feeding of pressurized air to opposite sides of the air cylinder 54 by means of separate hose lines 58 and 59. These lines extend to an air valve 62 (FIG. 1) which is controlled by the action of a cam follower 64 riding upon a projecting cam face 65 that is attached to the rotating cam member 30. A suitable source of compressed air is supplied to the air valve through line 66 and is then directed through the valve to one of the lines 58 or 59 dependent upon the position of the cam follower 64 and the valve spool which it controls, all in a well-known manner. A controlled bleeder valve 68 is provided to control and adjust the speed at which the piston 52 will be moved within the air cylinder 54. When the position of the air valve 62 is reversed, the discharging air from the cylinder 54 is prevented from escaping rapidly due to the smallness of the exhaust passage in the bleeder valve 68. The size of this passage is controlled by an adjustable set screw 69. The speed at which the transfer plate 46 will be moved along the bottom portion of the transfer device 18 is, therefore, regulated by the adjustment of the set screw 69 and the consequent size of the exhaust passage. This speed can be made to exactly approximate that velocity which will allow the pear to move into the transfer device with no appreciable frictional forces being applied thereto.

The air valve 62 is set so that the transfer plate 46 will move rearwardly within the transfer device 18 just as each pear P enters the transfer device across the lip 41. The plate will then move forward during some part of the discharge portion of the operating cycle, this movement having no appreciable effect upon the pear. The air valve is attached to the orienting apparatus 10 by means of a bracket 72 fixed to the bottom wall 16 of the chute 15 and by a mounting rod 74 which is fixed to the air valve. The mounting rod is adjustably connected to the bracket 72 by a pair of nuts 76 so that the fixed position of the air valve 62 with respect to the cam face 65 may be varied. By adjusting the mounting of the air valve, and consequently the timing of the cam follower 64 controlling the valve, the operation of the plate 46 can be synchronized with the cyclic operation of the remainder of the apparatus. Furthermore, the adjustable connection may additionally be used to regulate the length of movement of the plate 46 within the transfer device.

A modified form of the present invention is shown in FIGS. 3 and 4. In this embodiment of the invention the same fundamental principle is used in preventing mis-orientation of the fruit in that a moving surface transports each pear from the front to the rear of the transfer device. However, a continuously driven endless belt 78 is used for this purpose instead of the reciprocating plate 46 of the first embodiment. The belt 78 is trained around an idler roller 80 which is mounted at the open end of a modified transfer device 18a by means of brackets 81 and 82. The roller is arcuately curved so that the belt will at least partially conform to the curved surface of the bottom portion 40 of the transfer device (FIG. 3). At the rearward end of the transfer device a hole 84 is provided where the belt is run through to be received around a second and larger roller 86. The belt is continuously driven in the direction indicated by the arrow during the operation of the transfer device by means of the roller 86 which is rigidly fixed to a drive shaft 88. This drive shaft is mounted parallel to and rearwardly of the oscillating shaft 20 and is rigidly attached to the shaft 20 by a pair of clamping members 90 and 91 so that it will be oscillated with the transfer device when the pears P are discharged to the cups 24.

The drive shaft 88 is continuously driven by the assembly shown in FIG. 4 since the main drive shaft 28 which drives the conveyor 12 also drives a sprocket 94 which serves to rotate a sprocket 95 which is secured to a sleeve 97. The sleeve 97 is rotatably journalled on the shaft 20, and a gear 96 that is keyed to the sleeve is in mesh with a gear 98 which is affixed to the drive shaft 88 so that continuous power is supplied for the transfer belt 78. The drive shaft 88 is supported upon the orienting apparatus by a journalled connection with a pair of brackets 100 and 101 which are connected to the clamping members 90 and 91, respectively. By a careful selection of the proper gear ratios, the belt 78 can be made to travel at the proper velocity in order to prevent frictional forces from being imposed upon the pear which is introduced into the transfer device in the same manner as the sliding plate 46.

From the foregoing description it can be seen that an improved fruit transfer device has been provided which will accept fruit individually in a given alignment or orientation and which will maintain that orientation as it transfers the fruit to a new position by eliminating the frictional forces tending to disturb this orientation. Since this device is adapted for use in industry and is designed to be operated at high production speeds, it will be appreciated that the reduction of frictional forces to any degree will result in a significant increase in the efficient functioning of the over-all fruit processing system. The two disclosed embodiments of the present invention reduce frictional forces to a minimum during a critical fruit transfer operation and, therefore, will greatly contribute the effectiveness of a fruit processing system.

While only two embodiments of the present invention have been shown and described, it will be understood that various changes and modifications may be made therein without departing from the spirit of the invention or the scope of the appended claims.

The invention having thus been described what is believed to be new and desired to be protected by Letters Patent is:

1. A fruit transfer device comprising a channel having a bottom wall, a pair of side walls upstanding from the bottom wall, and an end wall connecting said side walls, said channel having an open end between said side walls and opposite to said end wall through which a fruit oriented with respect to the channel is arranged to be received; a movable support surface positioned upon said bottom wall of the channel; means for moving said support surface relatively to said channel and longitudinally thereof from said open end toward said end wall as said fruit is received in said channel; and means pivotally mounting said channel for movement about an axis disposed transversely thereof at the bottom of said end wall between a position with said bottom wall declined toward said end wall for receiving said fruit into said channel and a discharging position with said bottom wall declined toward said open end for discharging the fruit from said channel.

2. A fruit transfer device according to claim 1 wherein said movable support surface comprises an endless belt arranged for continuous movement and having a reach positioned adjacent to and paralleling the bottom of said transfer device.

3. In a continuous fruit handling system, a channel-shaped fruit transfer device having a closed end and an open end, said transfer device being arranged to periodically receive fruit in a predetermined orientation through its open end, means for reciprocating said transfer device between a first position with its open end at a higher elevation than its closed end for receiving said fruit and a second position with its open end at a lower elevation than said closed end for discharging said fruit, and a movable support surface at the bottom of said transfer device, said support surface being arranged to move relative to said transfer device and longitudinally along the bottom thereof from said open end toward said closed end when said fruit is received in said device and is allowed to gravitate toward the closed end thereof so that the fruit will maintain its said orientation within the device.

4. A continuous fruit handling system comprising a channel-shaped fruit transfer device having a closed end and an open end, said transfer device being arranged to periodically receive fruit in a predetermined timed and spaced relationship through its open end with each of said fruit being in an oriented position with its axis aligned in the longitudinal direction of the transfer device and with the stem end disposed in a particular position with respect to its movement into the transfer device, means for reciprocating said transfer device between a first position with its open end at a higher elevation than its closed end for receiving said fruit and a second position with its open end at a lower elevation than its closed end for discharging said fruit; said means operating in a cycle corresponding to said timed and spaced relationship in which the fruit is received within the transfer device, a movable support surface at the bottom of said transfer device, and means for moving said support surface relative to said transfer device and longitudinally along the bottom thereof from said open end toward said closed end when each of said fruit is received in said device and is allowed to gravitate toward the closed end thereof so that the fruit will maintain its said oriented position within the device.

5. A continuous fruit handling system comprising a channel-shaped fruit transfer device having a closed end and an open end, said transfer device being arranged to periodically receive fruit in a predetermined timed and spaced relationship through its open end with each of said fruit being in an oriented position with its axis aligned in the longitudinal direction of the transfer device and with the stem end disposed in a particular position with respect to its movement into the transfer device, means for reciprocating said transfer device between a first position with its open end at a higher elevation than its closed end for receiving said fruit and a second position with its open end at a lower elevation than its closed end for discharging said fruit, said means operating in a cycle corresponding to said timed and spaced relationship in which the fruit is received within the transfer device, a plate slidably positioned at the bottom of said transfer device and having a shape conforming to the shape of said bottom, a reciprocatory means for sliding said plate longitudinally along the bottom of the device from the open end toward the closed end thereof when said fruit is received in said device and is allowed to gravitate toward the closed end so that the fruit will maintain its said oriented position within the device, the operating cycle of said last named reciprocatory means corresponding to the operating cycle of said means for reciprocating the transfer device.

6. In a continuous fruit handling system, a chute through which a series of uniformly spaced fruit is progressed and in which said fruit is oriented into a stem end trailing position, a pivotable channel-shaped transfer device having a closed end and an open end with the walls of said device at the open end in a first position thereof being located adjacent to the walls at the end of said chute so that the transfer device forms a continuation of said chute, said device being oriented in said first position with its closed end at a lower elevation than its open end so that each of said fruit which is received from said chute will be in an oriented position with its axis aligned longitudinally of the device and will gravitate toward the closed end of the device with its stem end in a trailing position, means for sequentially pivoting said transfer device between said first position and a second position where said closed end is at a higher elevation than said open end and whereby said fruit is discharged by gravitating out of said device with its stem end in a leading position, said means for pivoting the transfer device operating in a cycle corresponding to the spacing between said fruit so that each of said fruit will be discharged in a like manner and orientation, a movable support surface at the bottom of said transfer device, means for moving said support surface relative to said transfer device and longitudinally along the bottom thereof from said open end toward said closed end as each of said fruit is received in said device so that the fruit will maintain its said oriented position within the device, and a removal conveyor comprising a series of fruit holding pocket spaced below said transfer device and arranged to receive said fruit as it is discharged from said device with the fruit being received in the pockets in a stem-end-down position.

7. A fruit handling system according to claim 6 wherein said movable support surface comprises a plate forming a movable bottom surface of the transfer device, and said means for moving the plate comprises a power means for slidably reciprocating the plate along the bottom of the transfer device in an operating cycle corresponding to operating cycle of said means for pivoting the transfer device.

8. A fruit handling system according to claim 6 wherein said movable support surface comprises a continuously driven endless belt mounted upon said transfer device and having a reach positioned adjacent to and paralleling the bottom of said transfer device.

9. Apparatus for positioning fruit with their stem ends down in a substantially horizontal conveyor which is moved past a station for receiving said fruit comprising an output channel having a bottom wall and opposite open and closed ends; means mouting the channel for pivotal movement about an axis extending transversely thereof and at the closed end thereof betweeen a fruit receiving position with said bottom wall declined toward said closed end and a fruit discharging position with said bottom wall declined toward said open end and said receiving station; an input chute adapted to guide fruit therealong with their stem-blossom axes disposed longitudinally of said chute; and means for transferring said fruit from said input chute to said output channel when the latter is in its receiving position so that each of the fruit which is propelled into said output channel will have its stem end facing the open end thereof; a movable support surface slidably positioned upon said bottom wall of the channel, means for moving said support surface longitudinally of and relatively to said channel from said open toward said closed end when said fruit is received within said channel to prevent a change in the orientation of said stem-blossom axes with respect to said channel whereby the fruit will gravitate out of said channel and into said conveyor with their stem ends down when the channel is in said fruit discharging position, the linear speed of said support surface relavtive to said channel approximately corresponding to the speed at which said fruit is guided along said chute.

10. In an apparatus for handling fruit, a chute, means for directing fruit in a predetermined direction into a fruit-receiving zone of said chute, a movable fruit interceptor member mounted in said fruit receiving zone, and means for moving said fruit interceptor member rearwardly in said chute in substantially said predetermined direction and at a speed approximately the speed of movement of the fruit into the chute whereby fruit delivered to said interceptor member will be carried rearwardly in said chute at approximately the speed with which it entered the chute.

References Cited by the Examiner
UNITED STATES PATENTS

| | | | |
|---|---|---|---|
| 2,868,353 | 1/1959 | Wakeman | 198—27 X |
| 3,084,779 | 4/1963 | Mladek et al. | 198—27 |
| 3,205,993 | 9/1965 | Chamberlin | 198—33 |

SAMUEL F. COLEMAN, *Primary Examiner.*